United States Patent Office 2,871,188
Patented Jan. 27, 1959

2,871,188

FLUID FOR DRILLING HIGH TEMPERATURE WELLS

Thomas E. Watkins, Arlington, Tex., assignor, by mesne assignments, to Socony Mobil Oil Company, Inc., New York, N. Y., a corporation of New York No Drawing. Application September 4, 1956
Serial No. 607,966

16 Claims. (Cl. 252—8.5)

This invention relates to drilling fluids and relates more particularly to a drilling fluid for use in the drilling of wells through earth formations having elevated temperatures.

In the rotary drilling of wells in the earth, a drilling fluid is continuously circulated from the surface of the earth through the drill pipe to the drill bit and then back to the surface of the earth through the annular space between the drill pipe and the walls of the well for the purposes of cooling and lubricating the drill bit and drill pipe, suspending and carrying cuttings to the surface of the earth, and imposing a hydrostatic pressure on the earth formations penetrated by the well to prevent escape of gas or liquid from the earth formations to the well. Usually, drilling fluids are thixotropic, i. e., they increase in gel strength when quiescent and decrease in gel strength when agitated, whereby the cuttings may be readily separated from the drilling fluid at the surface of the earth and, in the event circulation of drilling fluid is stopped for any reason, the cuttings will be properly suspended by the drilling fluid within the well and not sink to the bottom thereof with resultant danger of the drill pipe becoming stuck. The thixotropic properties of a drilling fluid are ordinarily imparted thereto by virtue of employing as one of the constituents thereof a clay such as bentonite. Since one of the functions of a drilling fluid is to impose a hydrostatic pressure on the formations penetrated by the well, it is desirable that the drilling fluid have a high density, and density of a drilling fluid is increased by adding thereto a weighting agent such as barite. Drilling fluids also often contain caustic soda which is added thereto to control viscometric properties, solubilize certain constituents such as quebracho, inhibit fermentation of organic additives such as starch, reduce the effect of contaminants picked up during drilling, and to achieve other effects depending upon the type of drilling fluid being employed. Calcium, in the form of lime, for example, is often added to drilling fluids in amounts greatly in excess of the amount that will dissolve in order to stabilize the drilling fluids against the effect of contaminants and to simplify problems of controlling the properties of the drilling fluid.

While conventional drilling fluids containing clay, weighting agents, caustic, and calcium in excess of the amount that will dissolve therein are ordinarily satisfactory for the drilling of relatively shallow wells where the temperatures of the formations penetrated by the well do not exceed about 250° F., various difficulties are encountered with such drilling fluids where the wells are relatively deep and the temperatures of the formations penetrated exceed 250° F. For example, at temperatures above 250° F., chemical reactions occur at appreciable rates between the clay, caustic, and calcium ions to form set or cemented aggregates whereby the gel strengths of the drilling fluids increase and even at temperatures of about 250° F. the gel strengths of the drilling fluids in contact with the high temperature formations become excessively high. Further, it is often desirable to log the well and when circulation of drilling fluid is stopped for this purpose, the consistency of these drilling fluids frequently becomes so high under the comparatively high temperature conditions prevailing that the logging tool is unable to descend through the drilling fluid and, additionally, restoration of circulation is extremely difficult. Similarly, the increase in the consistency of the drilling fluid may become so high as to seriously hinder or prevent movement of drilling tools or well completion tools.

It is an object of this invention to provide a drilling fluid suitable for drilling through earth formations having temperatures in excess of 250° F. It is another object of this invention to provide a low gel strength, high density drilling fluid. It is another object of this invention to provide a drilling fluid having a sufficiently low consistency at earth formation temperatures above about 250° F. to permit movement of drilling, logging, and well completion tools therein. It is another object of this invention to provide a drilling fluid having a relatively high electrical resistivity. Further objects of the invention will become apparent from the following description thereof.

In accordance with the invention, there is provided a drilling fluid containing water, bentonite, quebracho, lignitic emulsion stabilizer, caustic, heat stable water-loss reducing agent, weighting agent, oil emulsified as the discontinuous phase, and lime, the bentonite being in an amount at least as great as five pounds but not greater than ten pounds per barrel of drilling fluid exclusive of shales picked up from the earth formations, the quebracho being in an amount between 1.75 and 2.25 pounds per barrel of drilling fluid, the lignitic emulsion stabilizer being in an amount between 1.75 and 2.25 pounds per barrel of drilling fluid, the caustic being in an amount between 0.75 and 1.25 pounds per barrel of drilling fluid but not less than about one-fifth the total amount of the quebracho and the lignitic emulsion stabilizer taken together, the heat stable water-loss reducing agent being in an amount between 0.75 and 1.25 pounds per barrel of drilling fluid, the weighting agent being in an amount sufficient to give the weight desired for the drilling fluid, the oil being in an amount between nine and fifteen volume percent of the drilling fluid, and the lime being in the amount required to bring the pH of the drilling fluid to a value between 10.5 and 12.5, but preferably between 10.5 and 12.0. The amount of lime required to bring the pH of the drilling fluid to the desired value between 10.5 and 12.5 will be between 0.1 and 0.5 pound per barrel.

I have found that a drilling fluid containing the components and in the amounts given above is highly effective in the drilling of comparatively deep wells where the temperatures of the earth formations penetrated by the well bore hole are between about 250° F. and 325° F., and a drilling fluid having a relatively high density is required to overcome formation pressures. Under temperature conditions exceeding 250° F., and up to a temperature of about 325° F., the viscosity and gel strength of the drilling fluid of the invention remain sufficiently low that the fluid continues to be pumpable. Further, the build-up in gel strength remains at a minimum after circulation of drilling fluid has been discontinued. Thus, the well can be logged without difficulties arising from inability of the logging tool to descend through the column of drilling fluid in the well, and thereafter circulation of the drilling fluid can be restored. The drilling fluid, also, has a comparatively high resistivity, of the order of two ohm-meters, and will therefore permit the obtainment of good self-potential logs. Additionally, hindrance to movement of drilling tools or well completion tools is at a minimum. The density, furthermore, may be increased to a satisfactorily high value yet the viscosity and gel strength will remain satisfactorily low.

The bentonite employed must be a high grade bentonite. High grade bentonite consists primarily of sodium montmorillonite and is characterized by hydration and swelling in the presence of water. Preferably, the bentonite employed should consist of at least about 65 percent by weight of sodium montmorillonite. The drilling fluid may contain shale picked up from the drilled earth formations but must contain at least five pounds but not more than ten pounds per barrel of added bentonite.

Quebracho in the amount indicated is essential in order to assist in satisfactory dispersion of the solid materials in the drilling fluid. Lignitic emulsion stabilizer in the amount indicated is also essential in order to maintain the oil emulsified as the discontinuous phase. By lignitic emulsion stabilizer is meant any type of emulsion stabilizer containing lignin or a compound derived from lignin. A satisfactory lignitic emulsion stabilizer is lignin mined from deposits in the earth. The lignin may be employed as an emulsion stabilizer without preliminary treatment or may be treated for the purpose of increasing solubility. This treatment may involve admixture in the dry state of the mined lignin with a caustic, such as sodium hydroxide. The dry mixture may thereafter be ground. This lignin may be termed "caustic treated mined lignin." Another satisfactory lignitic emulsion stabilizer is lignin obtained directly from wood. This lignin may also be subjected to treatment to improve its properties. Other satisfactory lignitic emulsion stabilizers are salts of lignosulfonic acids. These salts may be obtained by treatment of lignin, either mined or obtained directly from wood, with fuming sulfuric acid or other sulfonating agents to form lignosulfonic acid. The lignosulfonic acid may then be converted to a salt as, for example, sodium lignosulfonate or calcium lignosulfonate.

It is essential that the drilling fluid contain caustic in the amount between 0.75 and 1.25 pounds per barrel of drilling fluid. Sodium hydroxide is the preferred caustic. While I do not wish to be limited to the consequences of any theory, it appears that the hydroxyl ion of the caustic is absorbed on the solid constituents of the drilling fluid and serves to assist in maintaining the solid constituents in a satisfactory state of dispersion. Further, the caustic solubilizes the quebracho and the lignitic emulsion stabilizer and accordingly the amount of caustic must not be less than about one-fifth the amount of the quebracho and the amount of the lignitic emulsion stabilizer taken together. On the other hand, the amount of caustic must not exceed 1.25 pounds per barrel of drilling fluid since apparently at earth formation temperatures in excess of 250° F. greater amounts of caustic tend to promote the formation of a zeolite type of compound which reacts with calcium ions and with quartz picked up by the drilling fluid from the earth formations to form other complex alkali metal calcium aluminum silicates or complex silicates, which in turn form set or cemented aggregates increasing the gel strength of the drilling fluid to inordinately high levels.

A water-loss reducing agent which is stable at temperatures in excess of 250° F. is required. While starch is ordinarily satisfactory as a water-loss reducing agent in drilling fluids employed in drilling through formations having comparatively low temperatures, it is unsatisfactory in drilling fluids employed in drilling through formations having a temperature in excess of 250° F. because of instability at the temperatures encountered. It is essential that the water-loss reducing agent in the drilling fluid of the invention be stable at temperatures in excess of 250° F. and sodium carboxymethylcellulose, sodium carboxymethylhydroxyethylcellulose, and polyacrylonitrile have been found to be satisfactory.

The amount of weighting agent added to the drilling fluid may be as desired to obtain the required density to counteract the formation pressures encountered. High formation pressures are ordinarily encountered in wells of such depth that the formation temperatures are in excess of 250° F. and amounts of weighting agent of the order of 300 to 500 or more pounds per barrel of drilling fluid may be employed. Lesser amounts of weighting agent may also be employed. As the weighting agent, barite is preferred. However, other weighting agents such as galena, iron oxide, etc., are satisfactory.

The liquid constituent of the drilling fluid comprises water having oil emulsified therewith as the discontinuous phase. The oil may be any type of oil hertofore employed for preparing emulsion drilling fluids. Generally, diesel oil is satisfactory and is to be preferred to lighter oils since the use of diesel oil is free of the safety hazards involved in the use of lighter oils. The amount of oil employed must be, as stated, between nine and fifteen volume percent of the drilling fluid.

The drilling fluid contains lime but the amount of lime employed must only be sufficient to bring the pH of the drilling fluid to a value between about 10.5 and 12.5. Preferably, the amount employed should only be sufficient to bring the pH of the drilling fluid to a value between 10.5 and 12.0. In any case, the amount of lime must at all times be less than the maximum amount that will dissolve in the fluid or, as stated otherwise, the drilling fluid must not be saturated with respect to dissolved lime. Where the amount of lime employed is insufficient to bring the pH of the drilling fluid to a value above 12.5, the drilling fluid will not be saturated with respect to dissolved lime since the pH of the drilling fluid will be above 12.5 at saturation. A pH of between 10.5 and 12.5 is obtained employing lime in the amount between 0.1 and 0.5 pound per barrel.

In preparing the drilling fluid, it is preferred to admix the quebracho, lignitic emulsion stabilizer, and caustic with a portion of the water, the amount of caustic being not less than about one-fifth the total amount of the quebracho and lignitic emulsion stabilizer, and add this mixture to the bentonite and the remainder of the water. Thereafter, the water-loss reducing agent, weighting agent, oil, and lime are added thereto in the order given. Additionally, when adding further quebracho and lignitic emulsion stabilizer to the drilling fluid, it is preferred to mix the caustic and a portion of water therewith, and add the mixture to the fluid.

In specific embodiments of the invention, the drilling fluid had the following compositions:

Composition A

| | |
|---|---|
| Bentonite | 5 pounds per barrel of drilling fluid. |
| Sodium hydroxide | 1 pound per barrel of drilling fluid. |
| Quebracho | 2 pounds per barrel of drilling fluid. |
| Caustic treated mined lignin | 2 pounds per barrel of drilling fluid. |
| Sodium carboxymethylcellulose | 1 pound per barrel of drilling fluid. |
| Barite | 500 pounds per barrel of drilling fluid. |
| Oil | 10% by volume of the drilling fluid. |
| Lime | 0.5 pound per barrel of drilling fluid. |
| Water | To make one barrel. |

Composition B

| | |
|---|---|
| Bentonite | 7.5 pounds per barrel. |
| Sodium hydroxide | 1 pound per barrel. |
| Quebracho | 2 pounds per barrel. |
| Caustic treated mined lignin | 1 pound per barrel. |
| Sodium carboxymethylcellulose | 1 pound per barrel. |
| Barite | 450 pounds per barrel. |
| Oil | 10% by volume of drilling fluid. |
| Lime | 0.4 pound per barrel. |
| Water | To make one barrel. |

Composition C

| | |
|---|---|
| Bentonite | 5.0 pounds per barrel. |
| Sodium hydroxide | 0.75 pound per barrel. |
| Quebracho | 1.5 pounds per barrel. |
| Mined lignin | 2 pounds per barrel. |
| Polyacrylonitrile | 1 pound per barrel. |
| Barite | 400 pounds per barrel. |
| Oil | 12% by volume. |
| Lime | 0.4 pound per barrel. |
| Water | To make one barrel. |

Drilling fluids having the above compositions have densities between about 16 and 18 pounds per gallon, viscosities of about 80 centipoises (Stormer), initial gel strengths of about 1.0 gram, 10-minute gel strengths between about 5 and 10 grams, pH's of about 11.5, and water losses of about 4.5 cubic centimeters as measured by the A. P. I. 30-minute water loss test. These drilling fluids have been successfully employed for the drilling of wells to depths of 15,000 feet, the formation temperatures being as high as 325° F.

This application is a continuation-in-part of my co-pending application, Serial No. 334,367, filed January 30, 1953, now abandoned.

Having thus described my invention, it will be understood that such description has been given by way of illustration and example and not by way of limitation, reference for the latter purpose being had to the appended claims.

I claim:

1. A drilling fluid for drilling in earth formations at a temperature in excess of 250° F. and up to about 325° F., said drilling fluid comprising water, bentonite, quebracho, lignitic emulsion stabilizer, caustic, heat stable water-loss reducing agent, weighting agent, oil emulsified as the discontinuous phase, and lime, the bentonite being in an amount at least as great as five pounds but not greater than ten pounds per barrel of drilling fluid, the quebracho being in an amount between 1.75 and 2.25 pounds per barrel of drilling fluid, the lignitic emulsion stabilizer being in an amount between 1.75 and 2.25 pounds per barrel of drilling fluid, the caustic being in an amount between 0.75 and 1.25 pounds per barrel of drilling fluid and not less than one-fifth the amount of quebracho and lignitic emulsion stabilizer taken together, the heat stable water-loss reducing agent being in an amount between 0.75 and 1.25 pounds per barrel of drilling fluid, the oil being in an amount between nine and fifteen volume percent of the drilling fluid, and the lime being in an amount between 0.1 and 0.5 pound per barrel of drilling fluid to bring the pH of the drilling fluid to a value between 10.5 and 12.5.

2. The drilling fluid of claim 1 wherein the lime is in an amount between 0.1 and 0.5 pound per barrel of drilling fluid required to bring the pH of the drilling fluid to a value between 10.5 and 12.0.

3. The drilling fluid of claim 1 wherein the caustic is sodium hydroxide, the heat stable water-loss reducing agent is sodium carboxymethylcellulose, and the weighting agent is barite.

4. The drilling fluid of claim 1 wherein the caustic is sodium hydroxide, the heat stable water-loss reducing agent is polyacrylonitrile, and the weighting agent is barite.

5. The drilling fluid of claim 1 wherein the caustic is sodium hydroxide, the heat stable water-loss reducing agent is sodium carboxymethylhydroxyethylcellulose, and the weighting agent is barite.

6. The drilling fluid of claim 3 wherein the lime is in an amount between 0.1 and 0.5 pound per barrel of drilling fluid to bring the pH of the drilling fluid to a value between 10.5 and 12.0.

7. The drilling fluid of claim 4 wherein the lime is in an amount between 0.1 and 0.5 pound per barrel of drilling fluid to bring the pH of the drilling fluid to a value between 10.5 and 12.0.

8. The drilling fluid of claim 5 wherein the lime is in an amount between 0.1 and 0.5 pound per barrel of drilling fluid to bring the pH of the drilling fluid to a value between 10.5 and 12.0.

9. A drilling fluid for drilling in earth formations at a temperature in excess of 250° F. and up to about 325° F., said drilling fluid comprising water, bentonite, quebracho, lignitic emulsion stabilizer, caustic, heat stable water-loss reducing agent, weighting agent, oil emulsified as the discontinuous phase, and lime, the bentonite being in an amount of at least five pounds but not greater than ten pounds per barrel of drilling fluid, the quebracho being in an amount of two pounds per barrel of drilling fluid, the lignitic emulsion stabilizer being in an amount of two pounds per barrel of drilling fluid, the caustic being in an amount of one pound per barrel of drilling fluid, the heat stable water-loss reducing agent being in an amount of one pound per barrel of drilling fluid, the oil being in an amount of ten volume percent of the drilling fluid, and the lime being in an amount between 0.1 and 0.5 pound per barrel of drilling fluid to bring the pH of the drilling fluid to a value between 10.5 and 12.5.

10. The drilling fluid of claim 9 wherein the lime is in an amount between 0.1 and 0.5 pound per barrel of drilling fluid to bring the pH of the drilling fluid to a value between 10.5 and 12.0.

11. The drilling fluid of claim 9 wherein the caustic is sodium hydroxide, the heat stable water-loss reducing agent is sodium carboxymethylcellulose, and the weighting agent is barite.

12. The drilling fluid of claim 9 wherein the caustic is sodium hydroxide, the heat stable water-loss reducing agent is polyacrylonitrile, and the weighting agent is barite.

13. The drilling fluid of claim 9 wherein the caustic is sodium hydroxide, the heat stable water-loss reducing agent is sodium carboxymethylhydroxyethylcellulose, and the weighting agent is barite.

14. The drilling fluid of claim 11 wherein the lime is in an amount between 0.1 and 0.5 pound per barrel of drilling fluid to bring the pH of the drilling fluid to a value between 10.5 and 12.0.

15. The drilling fluid of claim 12 wherein the lime is in an amount between 0.1 and 0.5 pound per barrel of drilling fluid to bring the pH of the drilling fluid to a value between 10.5 and 12.0.

16. The drilling fluid of claim 13 wherein the lime is in an amount between 0.1 and 0.5 pound per barrel of drilling fluid to bring the pH of the drilling fluid to a value between 10.5 and 12.0.

References Cited in the file of this patent

UNITED STATES PATENTS

| | | |
|---|---|---|
| 2,476,845 | Dawson | July 19, 1949 |
| 2,552,775 | Fischer et al. | May 15, 1951 |
| 2,578,888 | Kaveler | Dec. 18, 1951 |
| 2,691,630 | Watkins | Oct. 12, 1954 |
| 2,782,163 | Wilson | Feb. 19, 1957 |

FOREIGN PATENTS

| | | |
|---|---|---|
| 685,563 | Great Britain | Jan. 7, 1953 |